Jan. 8, 1952 E. G. YACKLEY ET AL 2,581,463

CASH REGISTER

Filed Sept. 14, 1948 10 Sheets-Sheet 1

Inventors
Edward G. Yackley
Norman L. Young
Earl H. Kunz

By Strauch & Hoffman
Attorneys

Jan. 8, 1952 E. G. YACKLEY ET AL 2,581,463

CASH REGISTER

Filed Sept. 14, 1948 10 Sheets-Sheet 2

Inventors
Edward G. Yackley
Norman L. Young
Earl H. Kunz

By Strauch + Hoffman
Attorneys

CASH REGISTER

Inventors
Edward G. Yackley
Norman L. Young
Earl H. Kunz
By Strauch & Hoffman
Attorneys Inventors
Edward G. Yackley
Norman L. Young
Earl H. Kunz
By Strauch & Hoffman
Attorneys

CASH REGISTER

INVENTORS
Edward G. Yackley
Norman L. Young
Earl H. Kunz
By Strauch & Hoffman
Attorneys Jan. 8, 1952 E. G. YACKLEY ET AL 2,581,463

CASH REGISTER

Filed Sept. 14, 1948 10 Sheets-Sheet 6

INVENTORS
Edward G. Yackley
Norman L. Young
Earl H. Kunz
By Strauch & Hoffman
Attorneys INVENTORS
Edward G. Yackley
Norman L. Young
Earl H. Kunz
By Strauch & Hoffman
Attorneys INVENTORS
Edward G. Yackley
Norman L. Young
Earl H. Kunz
By Strauch & Hoffman
Attorneys INVENTORS
Edward G. Yackley
Norman L. Young
Earl H. Kunz
By Strauch & Hoffman
Attorneys INVENTORS
Edward G. Yackley
Norman L. Young
Earl H. Kunz
By Strauch + Hoffman
Attorneys Patented Jan. 8, 1952

2,581,463

UNITED STATES PATENT OFFICE 2,581,463

CASH REGISTER

Edward G. Yackley, Norman L. Young, and Earl H. Kunz, Dayton, Ohio, assignors to Ohmer Corporation, Dayton, Ohio, a corporation of New York Application September 14, 1948, Serial No. 49,204

10 Claims. (Cl. 235—11)

This invention relates to registering or adding machines or the like, and in particular to the provision of means to convert a manually operated machine to one which is selectively motor or hand operated.

Reference may be made to United States Patents Nos. 1,708,189; 1,770,708; 1,993,452 and 2,201,319 for examples of one type of register with which the invention is concerned. In this type of register, for each denomination, there is a segment bar pivotally mounted by two spaced legs on a central shaft. When the control or release key is depressed to start the registering operation, each of the segment bars rotates downwardly to a point determined by the value of the amount key selected for each particular denomination. In addition, there are similar segment bars for the clerk's bank of keys and for the release key bank. Each of the segment bars, besides rotating downwardly due to their own weight, are urged downwardly by springs or the like to assure that the segment bars and associated elements will not lag behind a gravity bar, which restrains them during their downward movement until they are stopped by their respective depressed keys. On its return stroke the gravity bar re-engages the segment bars and returns them to zero position. The aforesaid springs and segment bars furnish enough power by themselves to lower the gravity bar until the bars are stopped by their keys. After all the segment bars have stopped however, the motor or hand drive must power the gravity bar to the end of its stroke and then through its return stroke. Hence when a motor drive is applied, there is a very great tendency for it to overspeed during the initial stroke of the gravity bar, resulting in bouncing of the indicator drums, etc. By means of our construction however, this tendency to overspeed is eliminated, resulting in smoother operation throughout each cycle, even though a "universal" alternating or direct current motor is used, which type of motor is subject to poor speed regulation within itself.

With the register driven by the motor, misuse of certain controls by the operator would cause the register to jam and we have provided means to prevent the jamming of the machine in this manner.

It is therefore a primary object of our invention to provide a new and improved cash register selectively operable by motor or by hand.

A second importan object of our invention is the provision of a motorized drive for a register wherein the motor speed is controllable to operate the register at a speed which will not be so high as to bounce and jar the mechanism, but yet will be sufficiently rapid that there will not be any delay in the operation of the register.

Another important object is the provision of novel and improved mechanism to prevent the intended or accidental jamming of the register by improper handling of the controls.

Other objects will become apparent as the description proceeds in connection with the accompanying drawings, wherein.

Figure 1:
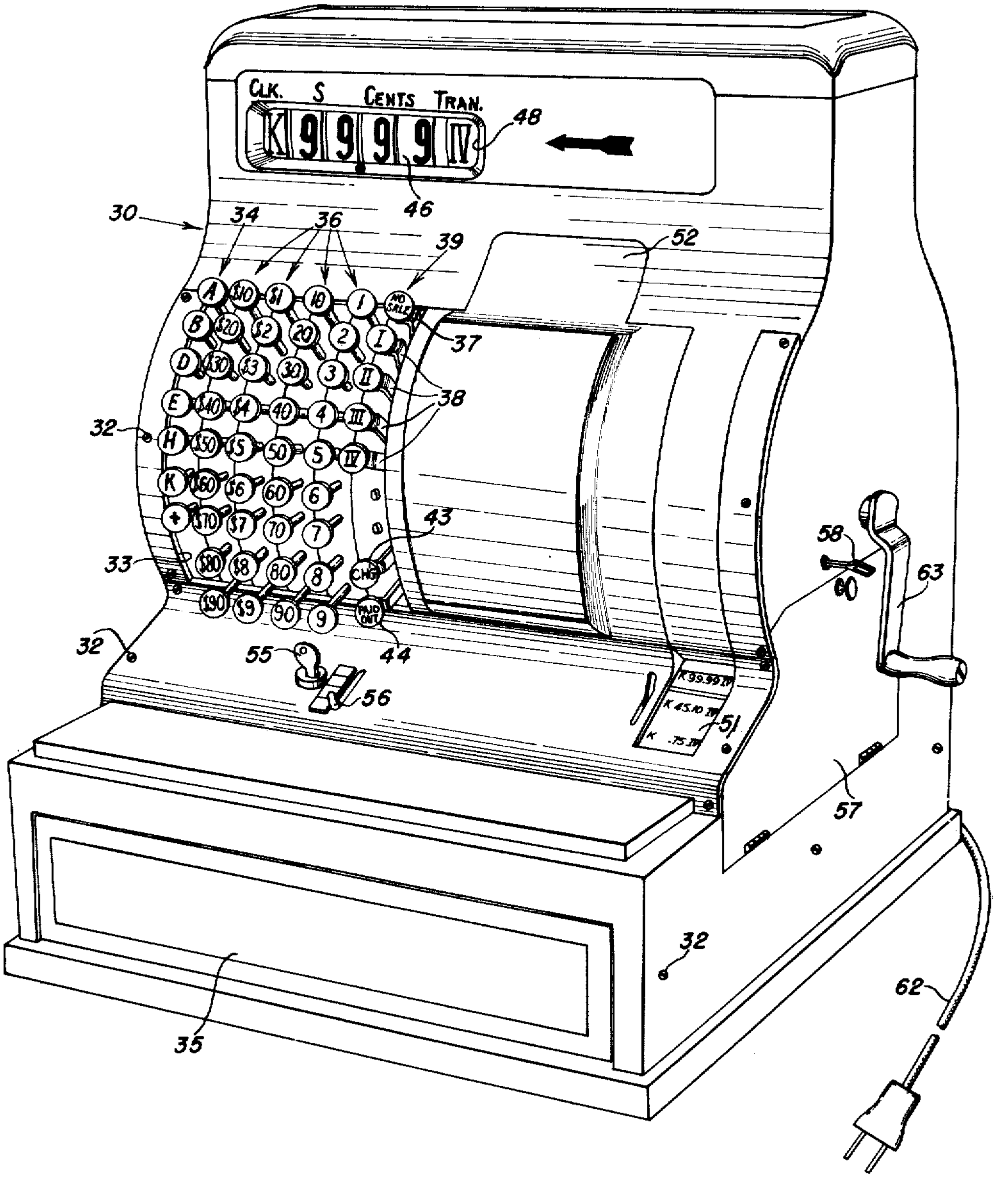
Figure 1 is a perspective view of a register embodying the invention.

Referring to the drawings Figure 1 shows a cash register constructed in accordance with our invention. The internal mechanism is enclosed by a casing generally indicated at 30, which is removably secured to the frame 31 (Figure 2) of the register by machine screws 32. Protruding through an opening 33 in the front of the casing are vertical banks or rows of keys which form the keyboard. The left hand vertical bank 34 are clerks' identification keys, and any one of these keys must be depressed to operate the register and open the cash drawer 35. The next four vertical banks 36 are amount keys, and the last or right bank 39 are release or control keys, any one of which must also be depressed to operate the register and open the cash drawer. In the release bank 39, the top key 37 is the "No Sales" key, the next four keys 38 are totalizer selector keys, and the bottom two keys 43 and 44 are "Charge" and "Paid Out" keys respectively, although they may have any other desired designations.

Figure 2:
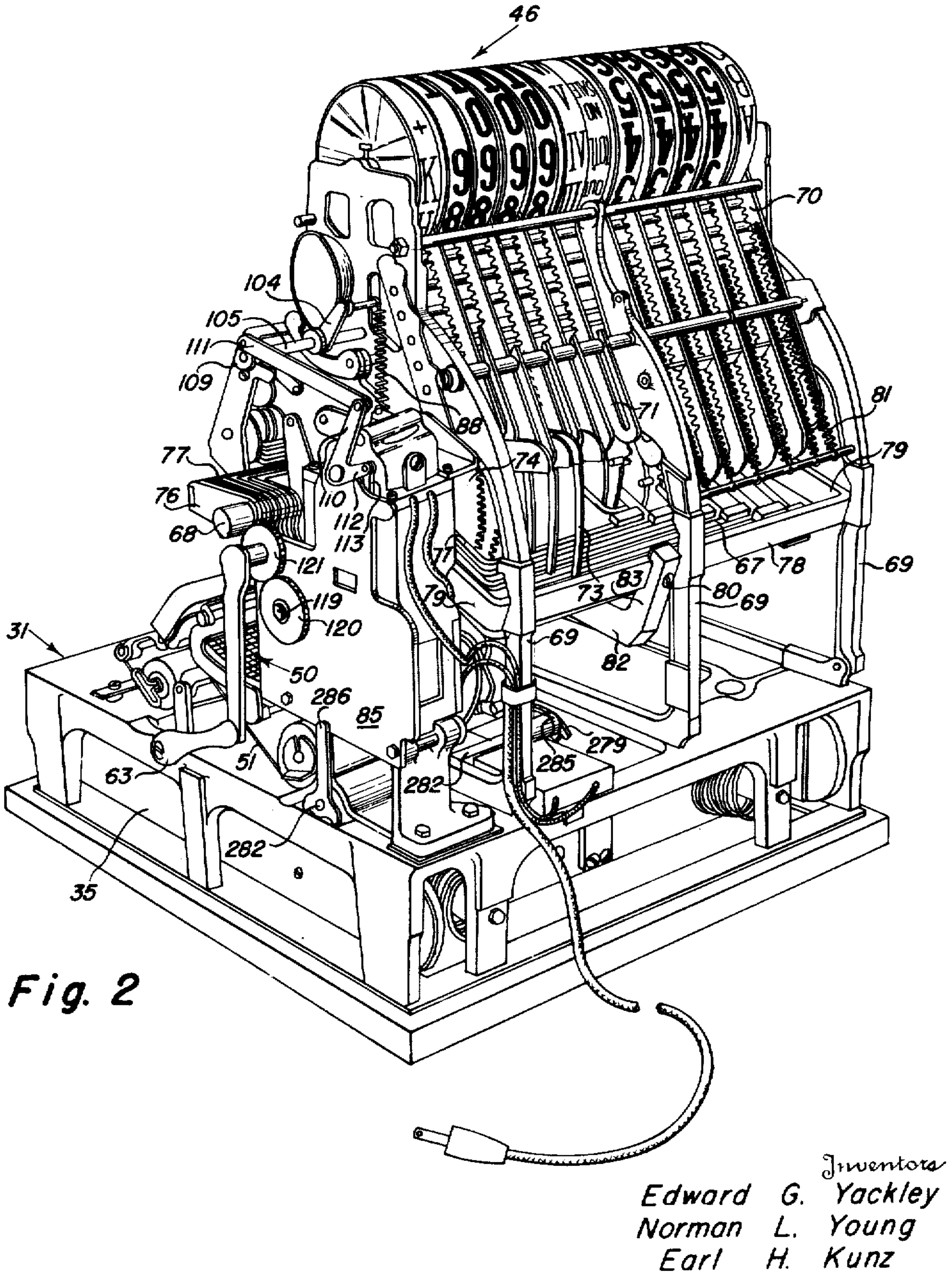
Figure 2 is a perspective view from the rear and side, of the register of Figure 1 but with its casing removed.

Indicating drums, generally designated by the reference number 46 in Figure 2, are controlled by the keyboard, half of them being visible to the operator through the window 48 of Figure 1, and the remainder of the drums being visible to the customer in the usual manner, as is apparent in Figure 2. A printing mechanism indicated generally at 50 in Figure 2, duplicates upon a record tape 51 the amounts and indicia set up by the keyboard and indicated by the drums 46.

A hinged counter hood 52 (Figure 1) forms part of the case, to cover the totalizers (not shown) which are selected by the totalizer selector keys 38, and is normally closed as shown, its opening being under the control of a master lock key 55 and rectilinearly movable handle 56.

On the right side of the casing 30 is a hinged door 57, normally locked by a key 58, through which access is gained to reload the record tape 51 or to release the cash drawer 35 without operating the register. Also shown on the right side of the register in Figure 1 is an electric cord 62 for supplying current to the register for automatic electric operation, and a crank 63 for operating the register by hand in the event of failure of electric current.

In normal operation of the register a clerks key 34 is depressed, next the proper number of amount keys, and finally one of the keys 38, or else either of the "Charge" or "Paid Out" keys 43 or 44. Upon the depression of the proper key in the release bank 39 the drawer 35 will open, the drums 46 will indicate the amount etc., and the printing mechanism 50 will record the indication upon the record tape 51. When it is desired to register a "No Sale" item the amount keys should not be depressed since the depression of any one of them prevents the operation of the "No Sale" key 37. There is no motor bar to be depressed, because the depression of any key in the release bank 39 actuates the register, as will become apparent.

Reference may be had to the Paden patents, No. 1,708,189 for details of totalizer selection and operation; No. 1,770,708 for details of drawer operation; No. 1,993,452 for the printing mechanism, and No. 2,201,319 for other details, all of these patents relating to a type of register to which the invention is applicable.

Figures 3, 3A:
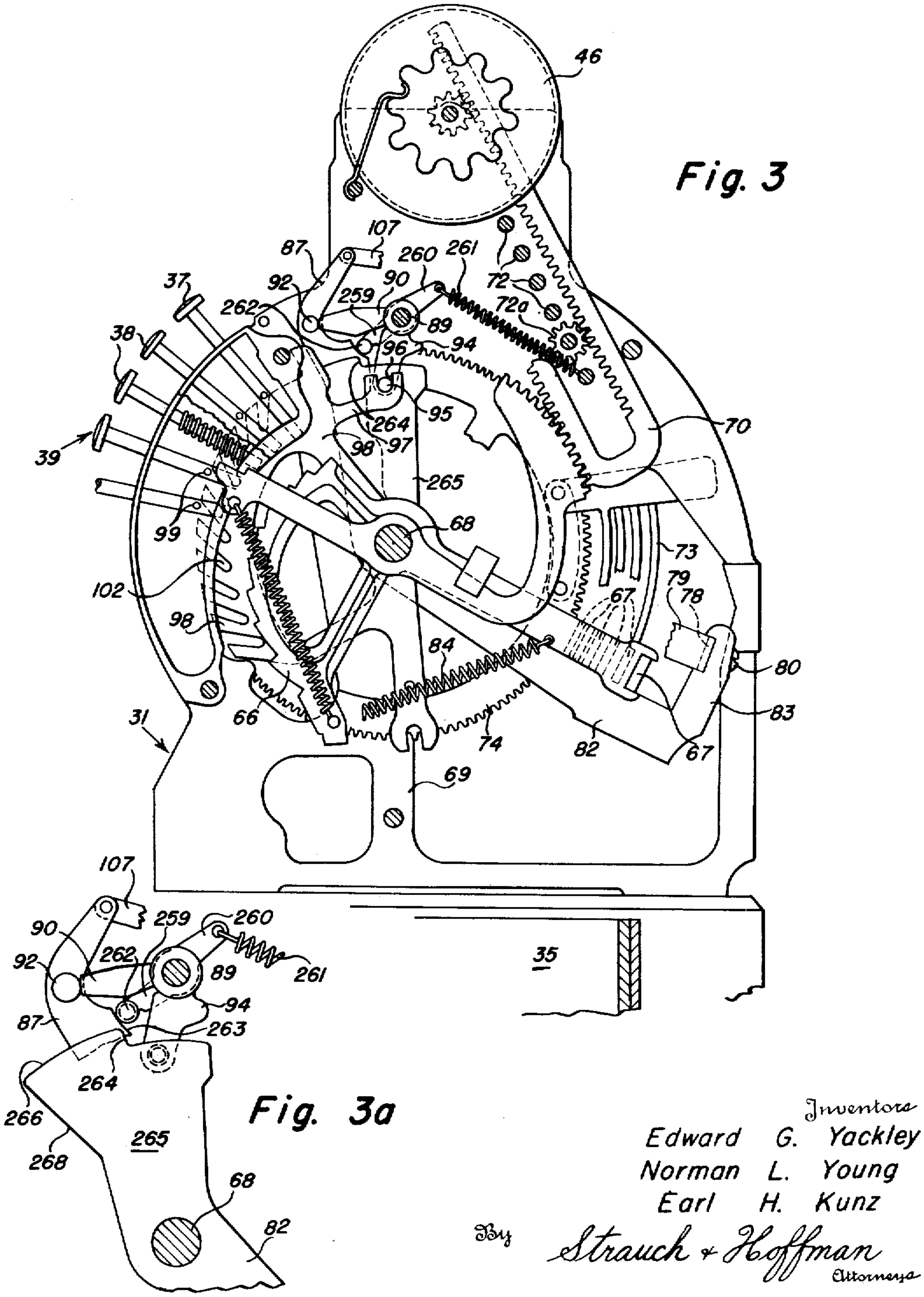
Figure 3 is a vertical section illustrating some of the mechanism controlled by the release bank of keys.
Figure 3*a* is a similar view of a portion of Figure 3, but more clearly illustrating some of the parts.

The details of construction by which depression of the keys results in the setting up of the amounts in the indicator and printer and in the totalizers is well known to those skilled in the art, and are shown in Figure 3, as well as in the aforementioned patents, a general description of their operation being sufficient for the purpose of this application.

Referring to Figures 2 and 3 there are six segment bars 67 in nested relationship, each bar having a forwardly extending leg on the motor side of the register and journalled on the main shaft 68 (Figure 3) which extends transversely through the register, being fixed in the vertical members 69 of the register frame. The other ends of the segment bars 67 are affixed to the segments 66 (Figure 3) which are journalled on the main shaft and stopped in their correct positions by the depressed keys when the register is operated. Movement of the segments is translated to the racks 70 (Figures 2 and 3) which in turn are geared to the indicating drums 46. The indicating drums 46 visible in Figure 1 are directly driven by the racks 70 while those visible from the back of the machine are driven by racks 71 (Figure 2), the latter being connected to racks 70 by rods 72 and pinions 72a (Figure 3).

Also visible in Figures 2 and 3 are the extensions or arms 73 one of which is secured to each of the adding wheel gears 74 so that the adding wheel gears will follow the movement of the individual segment bars 67, to add the registered amounts into the totalizers or counters, in the manner disclosed in the aforesaid patent No. 1,708,189.

The printing mechanism 50 includes a series of printer type segments 75 (Figure 4) rotatable about main shaft 68, there being one for each of the segment bars 67, and fastened integrally to forward extensions 77 on said bars for movement therewith, by means of arms 76, integral with the printer type segments.

Figure 4:
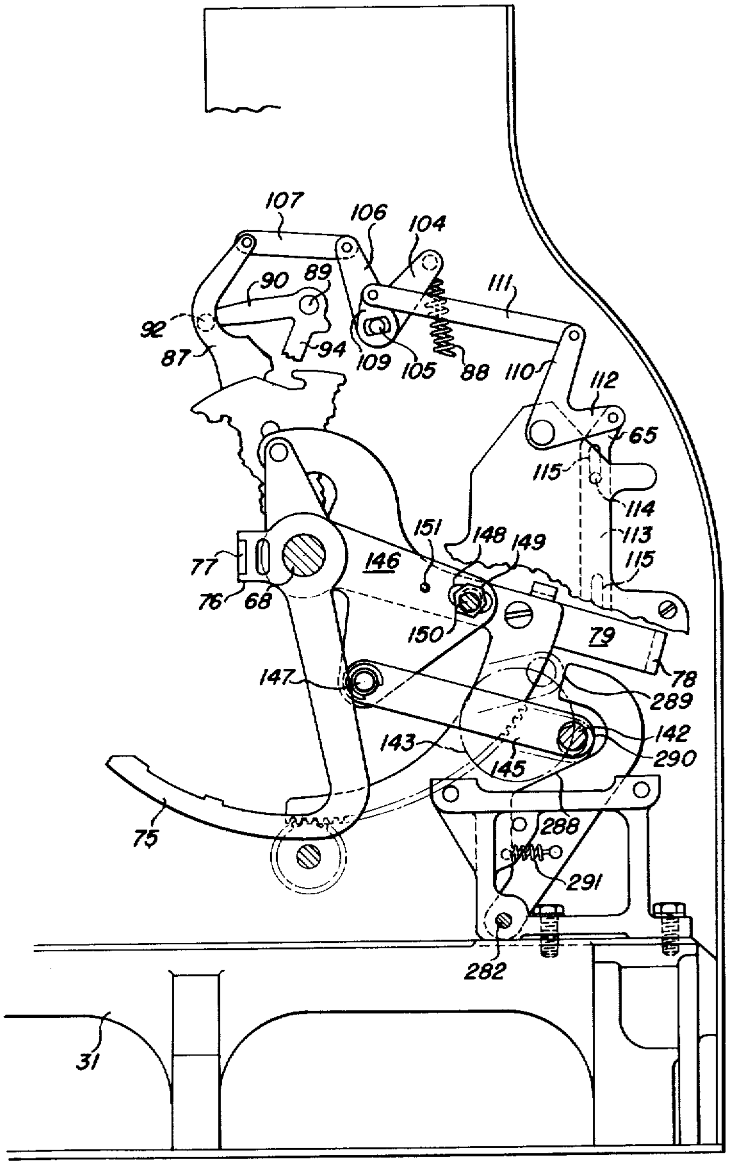
Figure 4 is a side elevation, partly in section, of the motor side of the register, showing the linkage by which the motor starting key is depressed.

All of the described elements are spring biased clockwise as viewed in Figures 3 and 4 by springs including the tension springs 81 (Figure 2), one for each of the racks 70, and which urge the racks downwardly, as well as by springs 84, Figure 3, connected to the four adding wheel gears 74 and also to the inner and outer segment bars 67 so that if there were nothing to restrain them they would be at the end of their clockwise stroke and the indicating drums 46 would indicate 99.99 as in Figure 2. The extent of their movement in the clockwise direction during any registering operation is determined by the keys that have been depressed. They are returned to their zero positions by the upward or counterclockwise movement of the gravity bar 78 which is journalled for rotation on the main shaft 68 by its legs 79 (Figure 2).

The gravity bar 78 has secured to it, as by a screw 80 (Figures 2 and 3) a portion 83 of a control arm 82 which control arm extends substantially radially toward the main shaft 68 upon which it is journalled for rotation. This control arm 82 underlies and engages all of the nested segment bars 67, so that they cannot move clockwise under the influence of their biasing springs until the control arm 82 is moved clockwise, and upon return movement of the gravity bar the control arm 82 picks up the segment bars from the places they have stopped, and returns them to their zero position.

Referring to Figure 2, an electric motor within motor housing 85, operated under the control of the keys in the release bank 39, serves to rotate the gravity bar 78, first clockwise, to the end of its stroke, and then counterclockwise back to its initial position in which it is shown in Figures 2, 3 and 4, by mechanism which will be described. In the event of power failure the crank 63 may be inserted and turned by hand to accomplish the same purpose, mechanism within the motor housing 85 preventing the operation of the crank until a key in the release bank 39 is depressed. Two complete revolutions of the crank are required to drive the register through a complete cycle.

Referring to Figures 3 and 4, an arm 87 is pivoted upon the main shaft 68 and is urged clockwise by a tension spring 88 (Figure 4). The arm 87 is however held towards the left by a bell-crank pivoted on a shaft 89 and having one leg 90 which engages a roller 92 on arm 87 to block rotation of the arm. The other leg 94 has a pin 95 (Figure 3) thereon which, in this first embodiment, is engaged in a notch 96 formed in an extension 97 of a release plate or cam member 98 rotatably journalled on the main shaft 68. Each of the keys in the release bank 39 has a pin 99 that engages in an inclined peripheral slot 102 in the release plate 98 when the key is depressed. Thus, depression of any key in the release bank 39 rotates the release plate 98 clockwise, and the pin 95 rotates the bell crank counterclockwise whereupon the leg 90 rides off the roller 92 to permit the arm 87 to move clockwise under the influence of spring 88. In another embodiment, which will be described later, the release plate 98 is in two relatively movable parts for a purpose to be described.

As shown in Figures 2 and 4, the spring 88 is connected to one end of a lever 104 fixed on a rotatable shaft 105. A lever 106, also fixed on the shaft 105, is connected by a link 107 (Figure 4) to the outer extremity of the arm 87, thus completing the linkage to transfer the force of spring 88 to the arm 87. The other end of the spring 88 is affixed to a point on the motor housing 85. Figures 2 and 4 also show a lever 109 fixed on the shaft 105 and connected to one arm 110 of a bell crank by a link 111. The other arm 112 of the bell crank is connected to the upper end of a motor starting key 113 which is mounted for vertical sliding movement within the motor housing 85 by means of two pins 114 (Figure 4) that pass through vertical slots 115 in the key. Thus, as the arm 87 is released for clockwise rotation under the influence of spring 88, the rotation of shaft 105 results in the simultaneous rotation of bell crank arms 110 and 112 and the depression of the motor starting key 113. As will be described, depression of the key results in the operation of the motor in housing 85, or else releases latching mechanism within the housing to permit the crank 63 to be turned through two revolutions to operate the register if the electric power has failed.

Figures 5, 6, 18, 19, 20, 21:
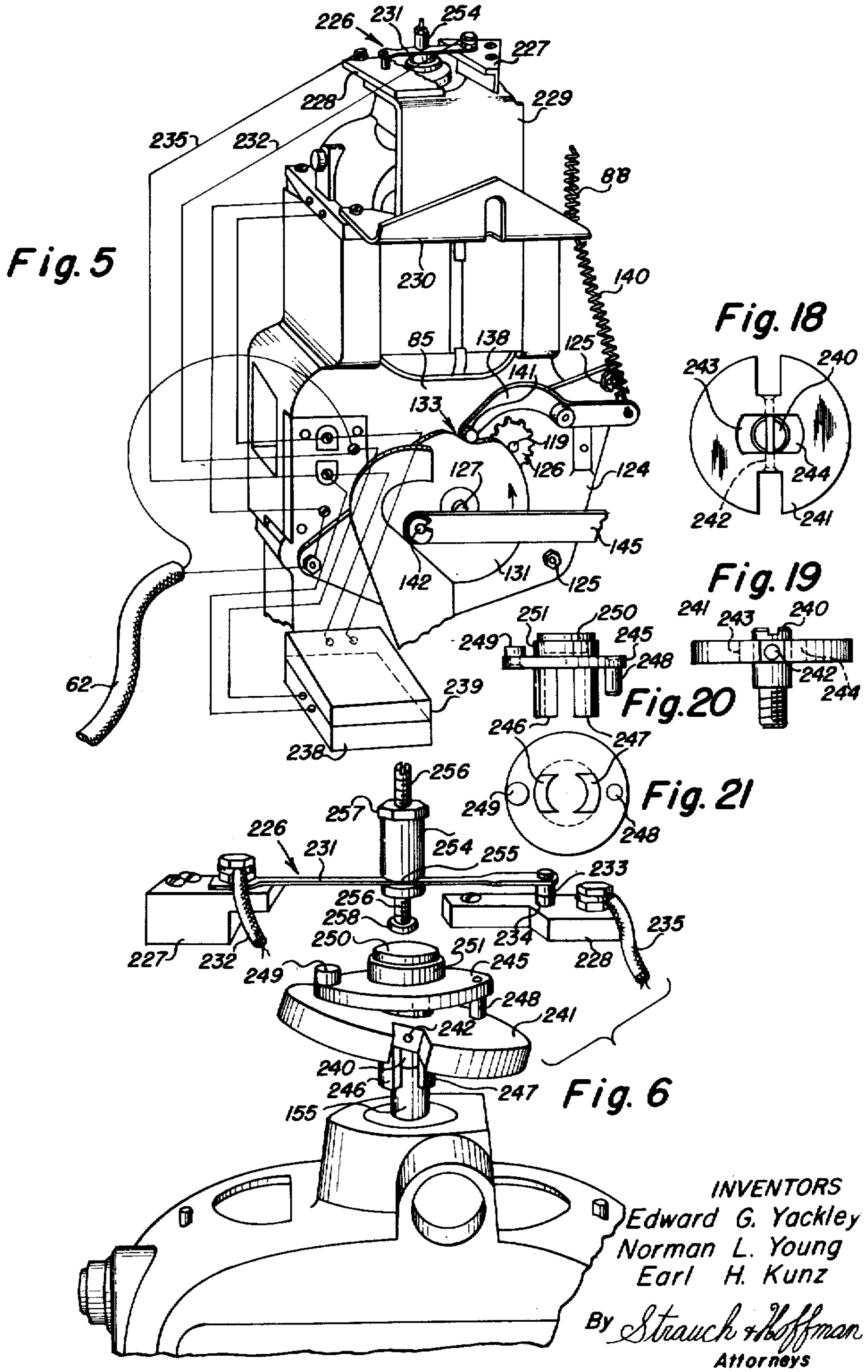
Figure 5 is a perspective view of that part of the motor assembly and related parts that faces toward the inside of the register and is therefore not visible in Figure 2. A speed control mechanism is shown as a modification.
Figure 6 is an enlarged perspective view of the top of the motor and showing the speed control mechanism.
Figures 18 and 19 are top plan, and side views respectively of an element of the motor speed control governor.
Figures 20 and 21 are side and bottom plan views of another element of the motor speed control governor.
Figure 7:
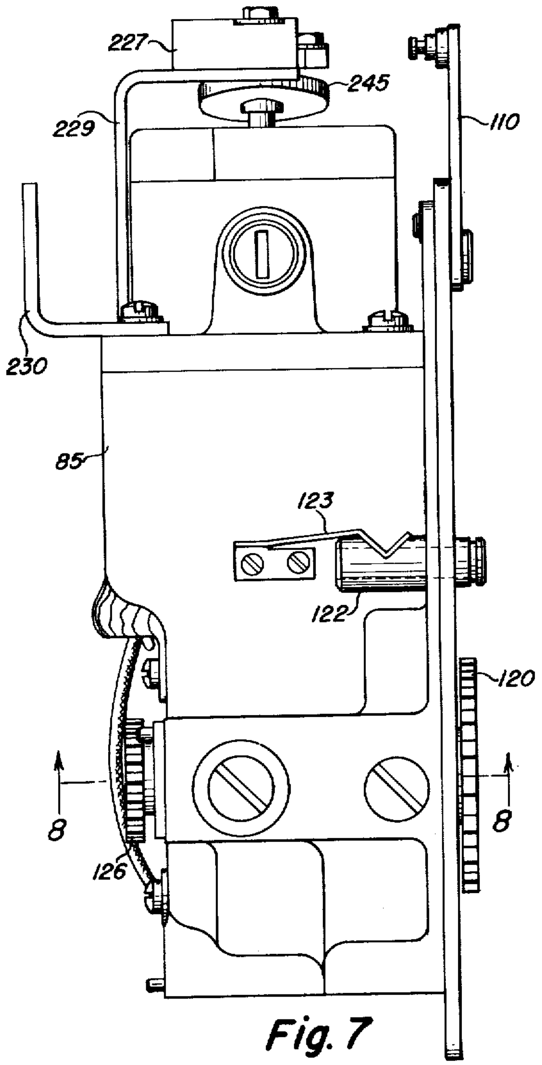
Figure 7 is a front view of the motor and housing.

Referring to Figures 2, 5, 8, 9, 13 and 14, a drive shaft 119 is transversely journalled for rotation in the motor housing 85. When crank operated, the drive shaft is actuated from the crank through the 1 to 1 ratio gears 120 and 121 (Figure 2). The gear 120 is affixed to the drive shaft 119 and gear 121 is rotatably journalled on the exterior of a hollow stud 122 (Figure 7) affixed to the wall of the motor housing 85, which hollow stud also journals for rotation the shaft of the removable crank 63. A spring 123 (Figure 7) mounted on the motor housing passes through a notch in the wall of the hollow stud 122, and when the crank 63 is inserted the spring engages a peripheral notch in the crank shaft to retain it in position in the stud. Whether the drive shaft 119 is crank or motor operated, it is rotated through two revolutions, and stopped by mechanism which will be described. Referring to Figure 5, the other end of the drive shaft 119 protrudes through the other side of the motor housing 85, and also through a mounting plate 124 which is secured to the opposite wall of the motor housing 85 as by bolts 125. On the outside of the mounting plate 124 there is a pinion gear 126 suitably keyed to the drive shaft 119, the plate 124 having an opening 126*a* (Figure 11) for the passage of the entire pinion gear 126.

Figure 12:
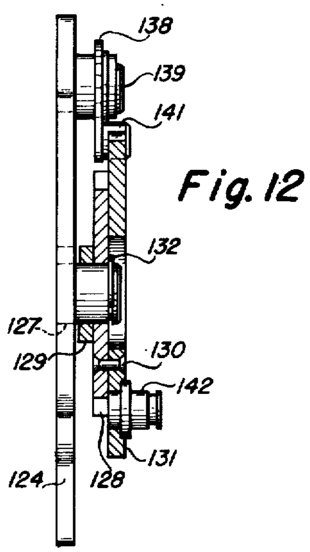
Figure 12 is a view looking at Figure 11 from the left, and partly in section along the line 12—12 of Figure 11.

A stud shaft 127 is rigidly fixed to the mounting plate 124, protruding only from the right side thereof, as viewed in Figure 12. A spur gear 128 is rotatably journalled upon the stud shaft 127, and is driven by the pinion gear 126 at a speed one-half that of the pinion gear. In order to extend the bearing surface of the gear 128 upon the shaft 127, the gear is provided with a hub 129 (Figure 12) which is suitably welded to the gear 128 so as to be integral therewith. On the opposite side from the hub 129, the gear has affixed thereto, as by rivets 130, a cam plate 131 which is of larger diameter than the spur gear 128. The cam plate has a central bore that is substantially larger than the diameter of the stud shaft 127, and the stud shaft does not protrude beyond the outer face of the cam plate. The rigid assembly of spur gear 128 and cam plate 131 is kept from sliding off the stud shaft 127 by a retaining ring 132 which slips over a peripheral groove in the stud shaft.

Figure 11:
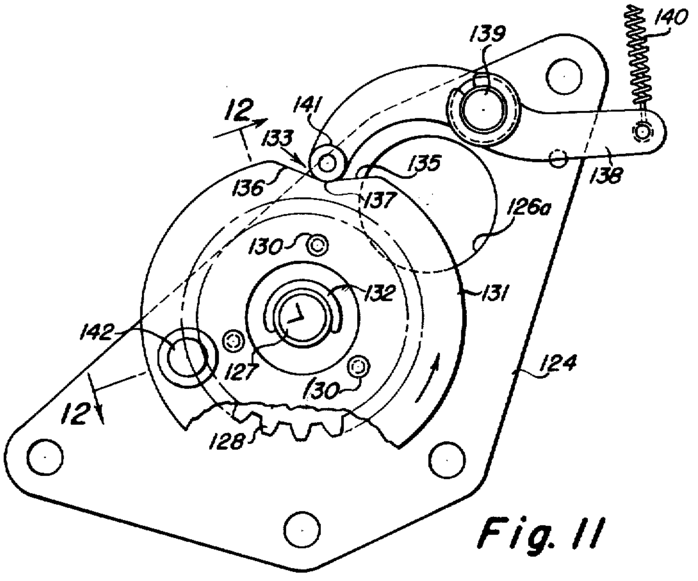
Figure 11 is an enlarged side view of a portion of the mechanism shown in Figure 5.

The cam plate 131 is provided with a peripheral notch 133 formed by two inclines 135 and 136 meeting at a low point 137. A bell crank 138 is pivotally mounted upon a fixed pin 139 protruding from the mounting plate 124 and it is resiliently urged in a counterclockwise direction by a tension spring 140 (Figure 5), the other end of which is attached to the other end of the motor housing structure. The other arm of the bell crank carries a roller 141. In Figures 5 and 11 the cam plate 131 is shown in its "home" position, or the angular position that it occupies when the register is at rest. When in that position the roller 141 is resting against the low point 137 of the notch 133 in the cam plate. The purpose of the bell crank 138 and the peripheral notch will be described later.

The cam plate 131 carries fixed to its outer surface a crank-pin 142 and a connecting rod or link 145 has one end mounted on the crank pin. When the cam plate is in its home position the crank-pin 142 is in the position shown in Figures 5 and 11. The crank-pin also appears in its home position in Figure 4 where the link 145 is shown to have its other end connected to a drive lever 146 by a pivot stud 147. In Figure 4, as well as in Figure 22, the circular path of the axis of crank pin 142 is shown at 143. Referring still to Figure 4, the drive lever 146 is somewhat triangular in shape, with one apex being mounted upon the main shaft 68. The other apex lies alongside a leg 79 of the gravity bar 78 where it has a slot 148 extending radially of the main shaft 68. An eccentric bushing having a hexagonal head 149 passes transversely through the slot 148. The bushing has the same diameter as the slot, but the bushing has an off-center bore therethrough by which means it is journalled upon a screw 150. When the screw 150 is loosened the bushing may be rotated by turning its head 149, thus shifting the drive lever 146 angularly about the drive shaft 68.

The adjustment provided by the bushing is for the purpose of assuring that the gravity bar 78 is in its home position, at the top of its stroke, at the same time that the crank pin 142 and the notch in the cam plate 131 are in their home positions. After the adjustment has been made, the drive lever 146 is securely clamped in its adjusted position to the leg 79 of the gravity bar by the screw 150, which is threaded into a tapped hole in the leg 79. This adjustment has to be made only during the final assembly of the register, and once made, a tapered hole is drilled through the drive lever 146 and the leg 79, and a tapered pin 151 (Figure 4) is driven into the hole to fix the drive lever and leg against relative movement.

For every complete operation of the register, whether by motor or by hand, the cam plate 131 rotates through exactly one revolution, counterclockwise as viewed in Figure 5, and clockwise as viewed in Figure 4 (where only the crank pin 142 is shown). Referring still to Figure 4, as the crank pin 142 rotates clockwise, because of the connection provided by the link 145, pivot stud 147, and the drive lever 146, the gravity bar 78 is also rotated clockwise to the end of its stroke which occurs when the crank pin 142 has moved 180 degrees from its home position. When the gravity bar has reached the end of its stroke, all of the segment bars 67 (Figures 2 and 3) together with the adding wheel gears 74 will have followed its rotation unless they have been stopped sooner by the depressed keys in the key banks. The printer type segments 75 (Figure 4) will have assumed positions corresponding to the keys which have been depressed, and the indicating drums 46 will indicate the keys that have been depressed.

During the second half of the revolution of the crank pin 142, the printer platen (not shown) will move the record tape 51 (Figure 2) against the printer type segments 75 to record the indication of the drums 46. The selected totalizer (not shown) will be pulled into engagement with the adding wheel gears 74 to add the indicated amount into the totalizer during the return rotation of the adding wheel gears. Near the end of the second half of the revolution, the depressed keys of the keyboard will be released by mechanism to be described.

In the former manually operated machine a tensioned spring was effective to drive the register through the same operations as are now accomplished during the first half of the rotation of crank pin 142. The remainder of the operations, which are now accomplished during the second half of the revolution of crank pin 142, were accomplished by manually pushing the cash drawer 35 to closed position. During this drawer closing operation the aforementioned spring was retensioned so as to be ready for the next operation. Movement of the drawer to closed position was transmitted to the control arm 82 (Figure 2) and the gravity bar 78 by a cam and roller which is not needed in the motor driven register. As a matter of fact in the illustrated motor driven register, the drawer need not be closed but may be left open without interfering with the operation of the register.

Figure 8:
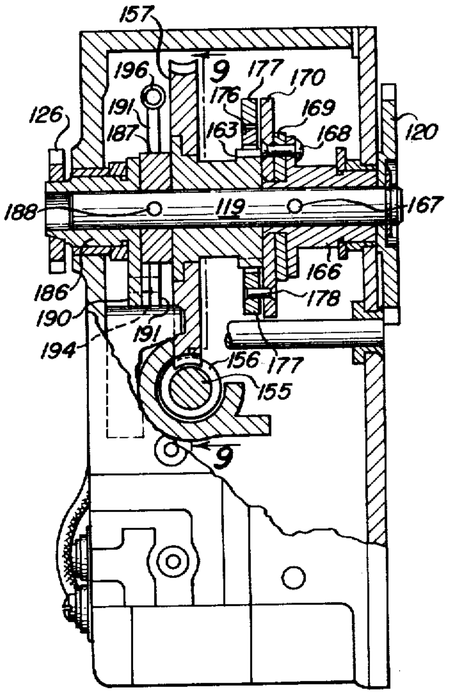
Figure 8 is a bottom view of the motor and housing, partly in section along the line 8—8 of Figure 7 and looking in the direction of the arrows.
Figure 9:
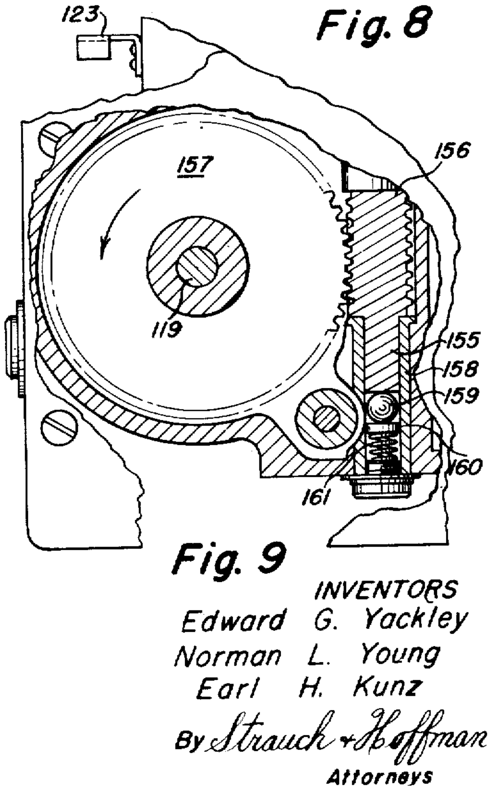
Figure 9 is a partial sectional view substantially along the line 9—9 of Figure 8.

The mechanism by which the drive shaft 119 is rotated through exactly two complete turns every time the register is operated will now be described. The motor armature shaft 155 is shown in Figures 6, 8 and 9, and as shown in Figures 8 and 9 it has an integral worm 156 that drives a worm gear 157 which is rotatably mounted upon the drive shaft 119. Referring to Figure 9, the lower end portion of the armature shaft 155 is journalled in a bushing 158. A ball thrust bearing 159 is held in engagement with the lower end of the armature shaft by means of a shoe 160 and thrust bearing spring 161 which is retained within the bore of the bushing 158 and against the shoe 160 by a plug member 162.

Since the worm gear 157 rotates freely on the shaft 119, the rotation of the motor armature shaft 155 is transmitted to the pinion gear 126 in the following manner. Integral with the worm gear is a ratchet 163 (Figures 8 and 13–16). A bushing 166 is rigidly secured upon the drive shaft 119 by means of a tapered pin 167. The bushing has a radial flange 171 to which are secured by means of rivets 168, a cam disc 169 and a stop disc 170. A ratchet engaging pawl is pivotally mounted upon the disc 170 by a pin 172 and in the plane of the ratchet 163. The pawl has a leg 175 which is operable to engage the ratchet 163, and a second leg 176 (best seen in Figures 13 and 14) which is engageable by a camming lever 177 that is pivotally mounted upon the same stop disc 170 by a pin 178. The pawl is resiliently urged in a clockwise direction as viewed in Figures 13–15 by a tension spring 179, the other end of which is attached to a pin 180 carried by the stop disc 170 and passing through a slot 181 in the camming lever 177, which slot limits the movement of the camming lever about the pin 178. The spring 179 is sufficiently strong to rotate the pawl clockwise into engagement with the ratchet, and by engagement of the leg 176 on the lever 177, forcing the lever 177 counterclockwise about its pivot 178. However, as will become apparent, the lever can be rotated clockwise with respect to its pivot 178, and engage the leg 176 on the pawl to overcome the spring 179 and disengage the pawl leg 175 from the ratchet.

Figure 15:
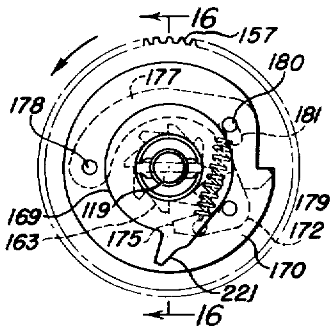
Figure 15 is an end view of the motor transmission mechanism shown in Figure 8 and also appearing in Figures 13 and 14.
Figures 13, 14:
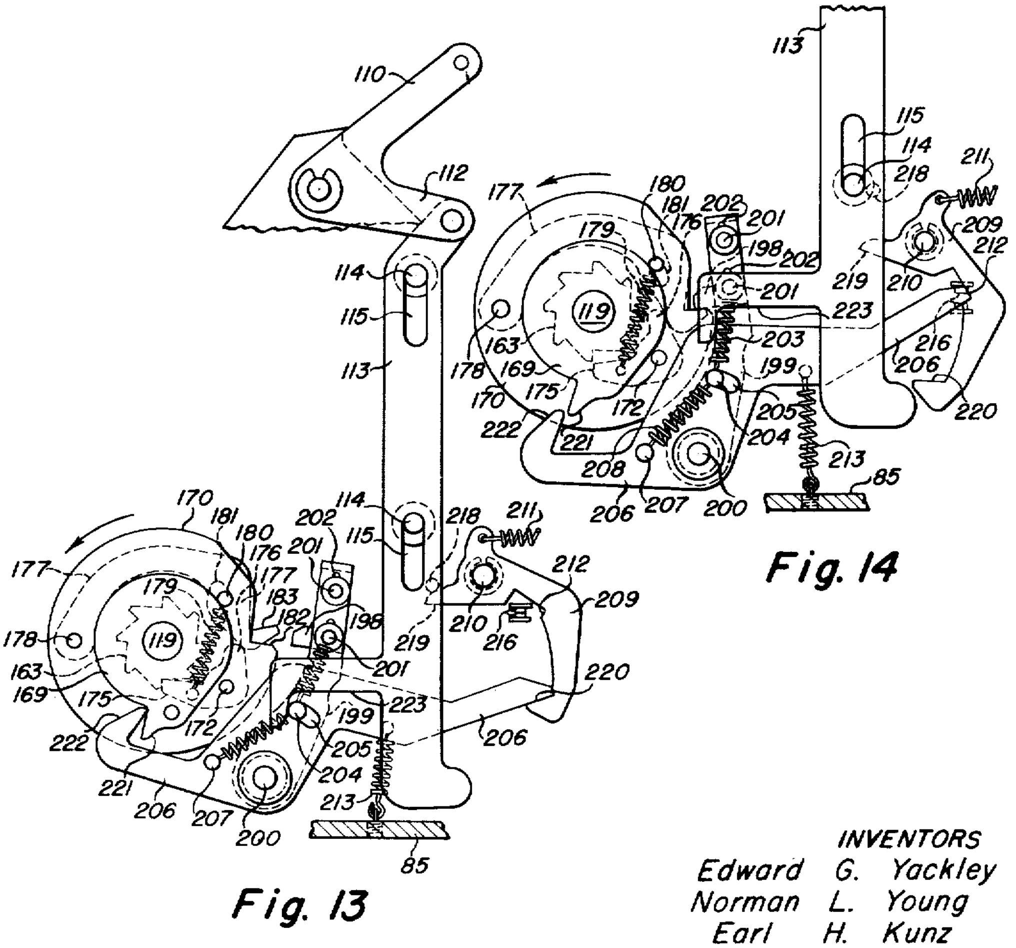
Figure 13 is a view of a portion of the mechanism within the motor housing which limits the turn of the drive shaft 119 to two turns. In this view the mechanism is in the position it occupies just after the drive shaft has completed its first revolution.
Figure 14 is a view similar to Figure 13, but with the parts in their "home" position, where they are when the register is not being operated.

The stop disc 170 has a peripheral notch one portion of which forms a substantially radial face 182 (Figure 13). The camming lever 177 has a hook thereon forming a substantially radial face 183 best seen in Figure 13, which is in substantially planar alignment with radial face 182 as shown in Figures 14 and 15 when the lever 177 has been rotated to disengage the pawl leg 175 from the ratchet 163. It will thus be apparent that unless the pawl leg 175 is held disengaged from the ratchet by the camming lever 177, the rotation of the worm gear 157 will be transmitted through the ratchet 163, the pawl, disc 170, and the bushing 166 to the drive shaft 119.

Figure 16:
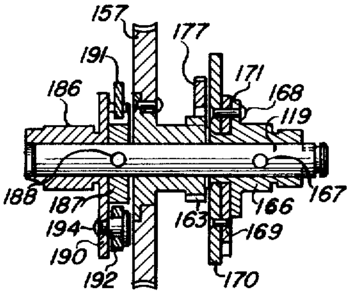
Figure 16 is a vertical sectional view along lines 16—16 of Figures 15 and 17; but with the view reversed end to end so that the elements are arranged in the same axial disposition as in Figure 8.

Referring to Figures 8 and 16, the pinion gear 126 is not affixed directly to the drive shaft 119, but is keyed to a bushing 186 which is rotatably mounted on the drive shaft. Rotation of the drive shaft is transmitted to the bushing 186 and pinion gear by an overload release clutch assembly in the following manner.

Figure 17:
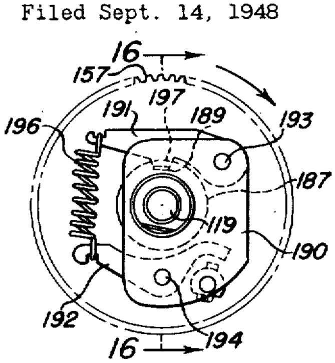
Figure 17 is the other end view of the mechanism shown in Figure 15.

A clutch disc 187 (Figures 8, 16 and 17) is secured to the drive shaft 119 by a tapered key 188 and has a peripheral notch 189 (Figure 17) having tapered sides. A plate 190 is integral with the bushing 186 and carries a pair of levers 191 and 192 (Figure 17) pivotally mounted thereon by pins 193 and 194 respectively. The levers 191 and 192 are resiliently urged together by a connecting tension spring 196, so as to retain in the notch 189 a mating projection 197 on the lever 191. The slope of the walls of the notch 189 and projection 197, and the tension of spring 196 is such that normal forces required to operate the register will be transmitted from the drive shaft 119 to the pinion gear 126. However if anything happens to jam the register, or to otherwise impose too great a load on the motor mechanism, the projection 197 will ride up out of the notch 189 and the motor transmission mechanism and drive shaft 119 can continue to complete their designed two complete turns without suffering injury.

The mechanism by which the drive shaft 119 is driven through two turns by the motor, or released and operable through two turns by the crank 63 will now be described. As previously described, the depression of a key in the control key bank 39 has as one result the downward sliding movement of the starting key 113 (see Figures 13 and 14) to the bottom of its stroke as determined by the limit of the slots 115. Before the starting key is moved downward all of the elements of the motor drive are in the "home" position shown in Figure 14. The pawl leg 175 is disengaged from the ratchet because a pawl 198 is engaging the radial faces 182 and 183 of the stop disc 170 and of the camming lever 177 respectively. The pawl 198 is slidably mounted upon the upper end of a lever 199 that is pivotally mounted upon a fixed part of the motor housing 85 by a pivot pin 200. The pawl 198 has a vertical leg with a pair of pins 201 fixed thereto that project through slots 202 on the lever 199 and the pawl is resiliently urged to the bottom of the slots by a tension spring 203, the other end of which is attached to a pin 204 on the lever 199, which pin projects through a slot 205 in another lever 206 that is also pivotally mounted on the pin 200. The lever 206 carries a pin 207 and a tension spring 208 connects pins 207 and 204 to urge the lever 199 counterclockwise with respect to the lever 206, which action urges the pawl 198 into the path of the radial faces 182 and 183 when the transmission is rotating, to disengage pawl leg 175 from ratchet 163 and simultaneously stop the disc 170, as will become apparent.

A latching lever 209 is pivotally mounted upon a fixed pin 210 and is resiliently urged clockwise by a spring 211. When the parts are in the "home" position shown in Figure 14 the right end of the lever 206 is engaged in a notch 212 near the middle of lever 209, being retained therein by the forces exerted by the spring 211 and by a tension spring 213, the latter spring being connected to lever 206 and to a fixed part of the motor housing 85.

Figure 10:
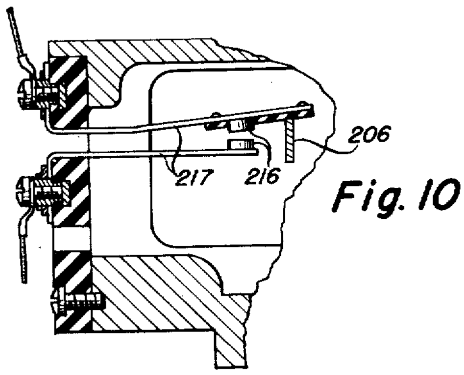
Figure 10 is a partial sectional view showing the main motor switch.

The main motor control switch comprises a pair of contacts 216 (Figure 10) carried by resilient arms 217 that normally maintain the contacts engaged to close the electric circuit to the motor. However, when the register is at rest and the motor transmission parts are in their home position (Figure 14) the right end of lever 206 engages the upper resilient arm 217 and holds the contacts 216 separated as shown in Figures 10 and 14.

All of the parts will remain as shown in Figure 14 until the register is operated by depressing a key in the release or control bank 39, resulting in the downward movement of the motor starting key 113. Just before it reaches the bottom of its stroke, a pin 218 fixed to the starting key strikes an arm 219 of the latching lever 209, rotating the latching lever slightly counterclockwise and releasing the right end of lever 206 from the notch 212. Under the force of spring 213 the lever 206 rotates clockwise until its right end engages a second notch or abutment 220 on the latching lever 209. During its movement, and because of the pin 204 projecting through the slot 205, the lever 206 rotates the lever 199 clockwise, thus releasing the faces 182 and 183 on the stop disc 170 and camming lever 177 from the pawl 198. Spring 179 simultaneously turns the ratchet pawl to engage its leg 175 with the ratchet 163. Since the release of the lever 206 from its home position in notch 212 also allowed the motor main switch contacts 216 to engage, the driving motor is also started at the same time that the transmission is conditioned to transmit the rotation of the motor armature shaft 155 to the pinion gear 126.

In this manner the drive shaft 119 is rotated through its first revolution. Referring to Figures 15 and 16, the cam disc 169 which rotates with the drive shaft 119, has a single rise 221 that engages a follower on the lever 206, and at the completion of a complete turn of shaft 119 the rise 221 has returned the lever 206 to its home position of Figure 14. However, the motor starting key 113 has an integral projecting latching member 223, which when the starting key is depressed, engages one side of the pin 204 and retains the lever 199 in the position shown in Figure 13, so as to keep the pawl 198 out of the path of the radial faces 182 and 183. Also, the pin 218 on the depressed starting key 113 retains the latching lever 209 in the position shown in Figure 13, so that notch 212 will not engage the lever 206, and as soon as the cam follower 222 passes the high point of the rise 221 the lever 206 will snap back to the position of Figure 13 under the influence of spring 213. During the instant that the lever 206 was in the position of Figure 14 it disengaged the motor switch contacts 216, but this instant is so brief that there is no noticeable pause in the operation of the motor, and the motor continues to drive the shaft 119 through a second revolution.

It will be remembered from the previous description that the first turn of the shaft 119 drives the gravity bar 78 (Figure 4) to the bottom of its stroke and the second turn of the shaft raises the gravity bar back to its zero position. It is therefore imperative that the cam plate 131 (Figure 5) be positively stopped at exactly the same "home" position for each operation of the register.

During the second revolution of the shaft 119, and when the gravity bar 78 is about one-third of its way back to its home position, the gravity bar effects the raising of the motor starting key 113 back to its fully raised position of Figure 14. Thus the integral latching member 223 disengages the pin 204 on lever 199. However, the lever 206 retains its position engaging the notch 220 in lever 209 because of the influence of springs 213 and 211. Now as the shaft 119 and cam disc 169 near the end of their second revolution the cam rise 221 rotates the lever 206 counterclockwise, the spring 208 simultaneously rotating lever 199 in the same direction, thus placing the pawl 198 in the path of the faces 182 and 183 on the disc 170 and lever 177. The pawl 198 is wide enough to engage both of these faces simultaneously. It will be noted from Figure 13 that the second leg 176 on the ratchet pawl, under the influence of spring 179, holds the camming lever 177 in such position that its face 183 is in advance of the face 182 on the stop disc 170. For that reason the face 183 will hit the pawl 198 and disengage the pawl leg 175 from the ratchet an instant before the face 182 on the disc 170 hits the pawl 198 to stop rotation of the drive shaft 119.

The slots 202 in the lever 199 permit the pawl 198 to rise slightly upon the impact of the faces 182 and 183, the spring 203 serving to cushion the impact. Since the drive shaft has been disconnected from the motor driven worm gear 157 by the release of the ratchet 163, the motor armature can continue to rotate under its momentum, even though the switch contacts 216 have been disengaged by the return of lever 206 to its home position, where it is retained by its engagement in the notch 212 in the latching lever 209.

The motor normally used in the register is of the "universal" alternating or direct current type and is therefore subject to very poor speed regulating. Due to the fact that in this register there is little load on the motor during the first turn of the drive shaft 119 as compared to the load during the second half, the motor has a tendency to overspeed during the first turn of the drive shaft particularly if line voltages are above their normal value. The spring loaded bell crank 138 and the roller 141 operate to reduce this overspeeding because of the friction of the roller on its shaft and on the cam plate 131, and particularly at the very beginning of the revolution due to the fact that a load is imposed upon the motor at the very start by the spring held roller 141 (Figure 11) which must be raised up the incline 135 of the notch 133 in the cam plate 131. After the roller reaches the top of the incline, the friction of the roller 141 on the cam plate 131 continues to be sufficient to resist the normal downward movement of the gravity bar, so that the motor must actually exert a torque to lower the gravity bar to the end of its stroke.

Another important function of the spring pressed roller 141 and the notch 133 is to bring the cam plate 131 and the associated drive shaft 119 and transmission to the home position. It sometimes happens that the drive will over run due to momentum of the moving parts. In so doing, the pawl 198 (Figure 14) will be wedged against the faces 182 and 183 to the extent that spring 213 will not rotate lever 206 clockwise when its right end is released from the notch 212 in the latching lever 209. Thus the notch 133 serves to prevent such over running because after the roller 141 reaches the low point 137 (Figure 11) of the cam plate 131 it tends to prevent further rotation of all of the rotating parts past their home position. The motor circuit is opened by the lever 206 separating the main switch contacts 216 just as the roller 141 enters the notch 133 and commences to roll down the incline 136.

Fluctuating supply line voltages, which range from 100 to 115 volts, pose a difficult problem because if the frictional load applied by the roller 141 is sufficient to prevent too rapid descent of the gravity bar 78 when the line voltage is high, the load was too great to obtain the desired register operating speeds. If the frictional load is removed and the line voltage is high, the downward movement of the gravity bar is so rapid that the indicating drums 46 have a tendency to bounce and give erroneous indications.

Because of the relative expense of voltage regulators to keep the supply voltage constant, another device is used, comprising a governor attached to the motor armature shaft and effective to pulse the input voltage to the motor if the motor reaches a maximum desirable speed. The assembled speed control mechanism is shown in Figures 5 and 6, and certain details in Figures 18 to 21 on the same sheet.

A breaker point assembly generally indicated at 226 comprises a pair of spaced insulating blocks 227 and 228 mounted on a bracket 229 secured to a motor housing mounting bracket 230. A flexible metallic leaf spring type breaker point arm 231 is rigidly secured at one end to the block 227 and has an electrical lead 232. The flexible arm 231 crosses the axis of the motor armature shaft 155 but is spaced above it, and the unsecured end of the arm has a conventional breaker point contact 233 which normally engages a similar contact 234 on the block 228 and is electrically connected to the lead 235. The breaker point assembly 226, through the leads 232 and 235, is in series with the main motor control switch formed by the contacts 216 of Figure 10, so that both sets of contacts must be engaged in order to supply current to the motor. Contacts 233 and 234 are bridged by a suitable condenser 238 (Figure 5) and the contacts 216 are bridged by another condenser 239. When the motor speed exceeds a certain value the breaker point arm 231 is automatically flexed upward by means which will be described, to open the contacts 233 and 234 until the motor speed has reduced to the correct value.

Referring to Figures 6 and 18 to 21, a stud 240 having the same diameter as the upper end of the armature shaft 155 is threaded into the upper end of the shaft to form an extension thereon. A disc 241 is pivotally mounted upon stud 240 on a diameter thereof, by a pin 242. The disc 241 can therefore flop about its axis 242, but as the motor armature speeds up centrifugal force will tend to maintain the disc in a plane at right angles to the axis of the armature shaft. As best shown in Figure 18, the disc 241 has a central elongated opening through which the stud 240 passes, so that when the disc is assembled on the stud there are two diametrical openings 243 and 244 in the disc.

A second upper disc 245 has a pair of downwardly depending legs or tangs 246 and 247 which are of such transverse cross sectional dimensions that they slip freely through the openings 243 and 244 in the pivoted disc 241, and hold the upper disc in axial alignment with the stud 240 while permitting free movement of the upper disc 245 axially of the stud. The legs 246 and 247 have sufficient clearance with respect to the outer curved surfaces of the openings 243 and 244 in disc 241 so as not to interfere with the free pivoting movement of disc 241 about the pin 242. Adjacent its periphery, and on the same diameter as the legs 246 and 247, the upper disc 245 has a downwardly extending lifting stud 248, which because of the free vertical sliding movement of the upper disc on the stud 240, will tilt the lower disc about its pivot pin 242 as shown in Figure 6. The weight of the disc 245 and its integral elements is such as to depress the disc 241 in this manner, and even to keep it slightly depressed at high motor speeds in spite of the effect of centrifugal force which acts to urge the lower disc 241 to rotation in a horizontal plane.

It will be apparent that the vertical position of the upper disc 245 upon the stud 240 will depend upon the motor speed and this movement is used to pulse the current supply to the motor as will be exlained.

In order to counter-balance the weight of the lifting stud 248, the upper disc 245 is provided with a weight in the form of an upwardly extending stud 249 on the diametrically opposite side from the stud 248. An insulating cap member 250 projects above a flange 251 integral with the upper disc 245, the cap being press fitted into a recess in the flange.

The breaker point arm 231 carries a cylindrical stud member 254 which has a transverse slot 255 by which it is slipped over the arm 231. The slot should be narrow enough so that there will be a press fit between the stud and arm to retain the stud in fixed position on the arm. The stud is coaxial with the motor armature shaft 155 etc. An adjusting screw 256 is threaded axially through the stud 254 and is adjustable axially therein by turning it with a screw driver engaging a slot in the top thereof. Once adjusted to proper axial position it is locked in position by a nut 257. At its lower end the screw 256 has a head 258 which is engaged by the insulated cap member 250 when the motor runs beyond a desired speed. The vertical force exerted by the cap member 250 will push up on the screw 256 and lift the arm 231 to disengage the contacts 233 and 234, thus stopping the power supply to the motor until it slows down again to the point where the pivoted disc 241 allows the upper disc to drop and close contacts 233—234 again.

Adjustment of the speed control is readily accomplished while the motor is running. With the aid of a speed indicator to measure the motor speed it is adjusted to a speed of approximately 8150 R. P. M. This motor speed will operate the register about 55 times a minute. Thus in a normal operation, after the proper key in the release bank has been depressed, the register will operate through a complete cycle in a little over one second. This has been found to be a satisfactory speed, and one wherein there is no overspeeding or bouncing of the register mechanism.

Referring to Figures 3 and 3*a*, it will be remembered that in that embodiment the release plate 98 has a rearward extension 97 having a notch 96 therein, which engages a pin 95 on the bell crank 90—94, and that when a key in the release or control key bank 39 is depressed it will cam the release plate 98 clockwise. The bell crank 90—94 is thus rotated counterclockwise to release the arm 87 and close the motor switch.

Another bell crank having substantially radially disposed arms 259 and 260 is pivotally mounted upon the shaft 89, being urged in a clockwise direction by a tension spring 261. The arm 259 of the bell crank has a pin or roller 262, that when the arm 87 is in the home position, engages a curved face 263 (Figure 3*a*) on the arm. The arm 259 of the bell crank is bent laterally so as to engage the underside of the arm 90 of the bell crank 90—94. Thus, as described in Patent 2,201,319, counterclockwise rotation of bell crank 90—94 results in counterclockwise rotation of bell crank 259—260. The pin 262 is thereby disengaged from the curved face 263 and is rotated to a position to the right of an abutment 264 on a dog leg 265 integral with the control arm 82.

As the control arm is rotated clockwise by the motor, the abutment 264 engages the pin 262 and rotates the bell crank 259—260 counterclockwise until the pin 262 rides up the abutment and onto a circular peripheral surface 266 at the extremity of the dog leg 265. By the time the gravity bar 78 and the integrally connected control arm 82 reach the end of their downward stroke the pin 262 has run off of the peripheral surface 266 and lies in front of the dog leg 265. On the return stroke of the gravity bar the front face 268 of the dog leg engages the pin 262 and rotates the bell crank 259—260 clockwise and back to its initial position where it is shown in Figures 3 and 3*a*. At the same time that the pin 262 is moved clockwise by the face 268, the pin engages the rear face of the arm 87 and turns it counterclockwise back to its "home" position of Figures 3 and 3*a*, against the action of spring 88 (Figure 4). This results in the simultaneous raising of the motor starting key 113 (Figure 4) and thus the opening of the main motor switch contacts 216 (Figure 10). As previously described, this opening of the main motor switch occurs about the time that the roller 141 (Figure 11) starts to travel down the incline 135 of the notch in the cam plate 131.

After the front face 268 of the dog leg 266 has turned the pin 262 to its home position and shut off the motor, the register coasts until the dog leg 265 is in the relative position shown in Figure 3*a*, and the roller 141 rests against the low point 137 in the notch 133. All of the elements of the register have thus been returned to their "home" position.

Figure 22:
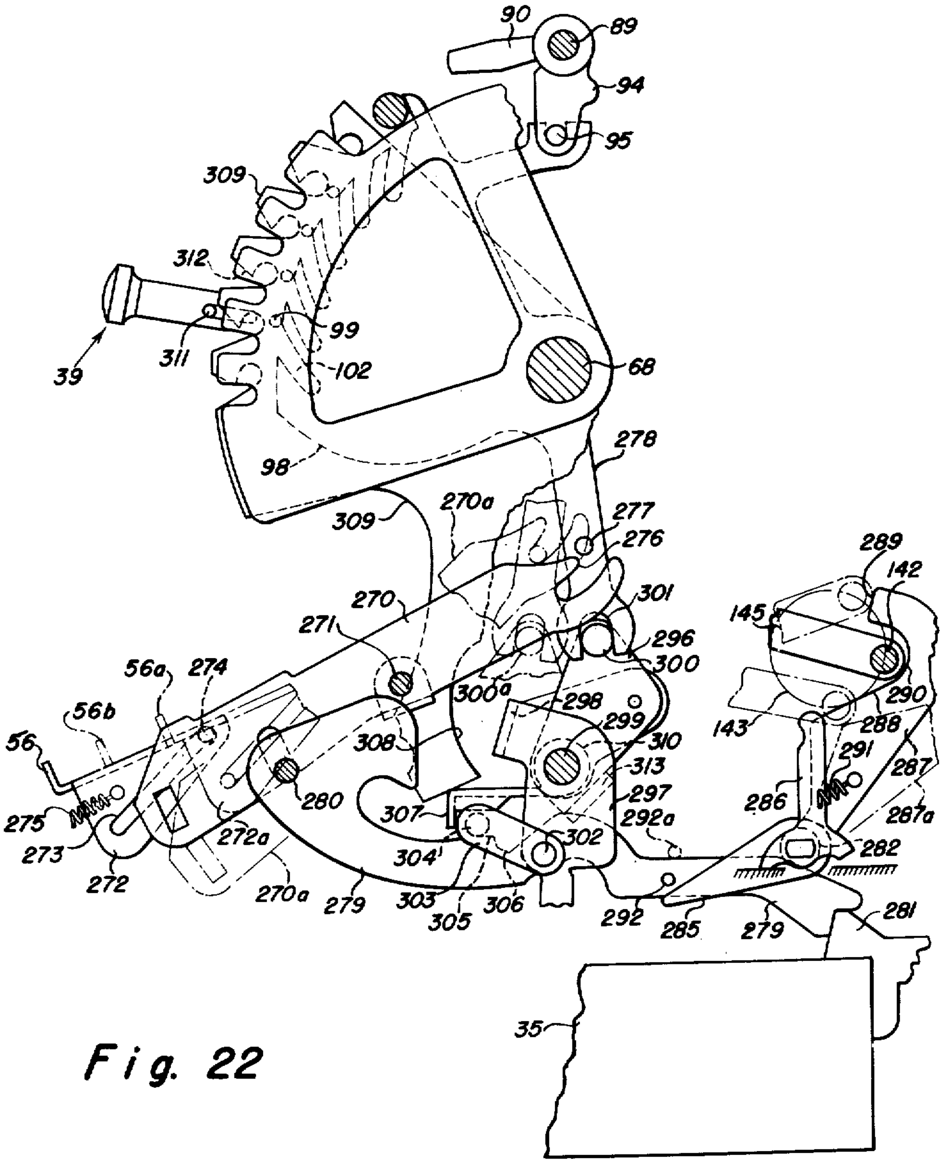
Figure 22 is a partial longitudinal sectional view through the register, showing the release bank of keys and associated mechanism, together with the mechanism for opening the cash drawer.

The mechanism shown in Figure 22 relates to the release key bank 39, and associated mechanism, together with the drawer release mechanism and the pivoted control arm 270. As described in the previously mentioned Patent No. 1,770,708 to Paden, the pivoted control arm 270 is positioned in any one of three positions about its mounting shaft 271. When in the normal position shown in solid lines in Figure 22 the control arm 270 permits normal operation of the register in the manner so far described. When the control arm is rotated to the position shown in dot-dash lines at **270*a* it releases the counter hood 52 (Figure 1) so that the departmental totalizers are exposed to view. As described in the Patent 1,700,708 the depression of one of the clerks keys 34, followed by rotation of the control arm 270 to the position at 270*a* results in the opening of the cash drawer 35, the unlatching of the counter hood 52, and the setting of the indicating drums 46 to indicate that the totals are being read. In the present machine the drawer is also opened at the same time, but in a different manner, by mechanism shown in Figure 22. Also, in the present machine, since the aforesaid rotation of control arm 270 to the position at 270*a* results in the operation of the motor drive through a complete cycle, the printing mechanism is also operated to print upon the record tape 51 (Figure 2) the same figures that appear upon the indicating drums 46**.

The position of the control arm 270 is determined by the rectilinearly movable handle 56 (Figures 1 and 22) which is attached to the casing 30 of the register for sliding movement from the lower position shown in solid lines in Figure 22 to the upper dotted line position 56a in the same figure. The handle 56 has integral therewith a vertical ear 272 having an inclined slot 273 therein which receives a pin 274 fixed to the control arm 270. From Figure 22 it will be seen that as the handle 56 is moved from its lower position to its upper position 56a the slot 273 will, by means of the pin 274, rotate the control arm counterclockwise to its position at 270a. A spring 275 resiliently urges the handle 56 to its normal and lowermost position, and before it can be moved away from this normal position the master lock key 55 must be turned to the proper position to remove an obstructing lock bolt (not shown). When the key 55 is removed the handle is locked in its lowermost and normal position, so that the register can be used only for registering operations.

The key 55 is also positionable to an intermediate position whereby the handle 56 can be pushed up and locked in an intermediate position 56b, thus rotating the control arm 270 to an intermediate position wherein it locks the register against any operation. When the control arm 270 is in such intermediate position, a lip 276 adjacent its right hand end has been so positioned in front of a pin 277 on a depending leg 278 of the release plate 98 that it blocks the release plate 98 against the clockwise rotation that is required for operation of the register.

As shown in Figure 22, the cash drawer 35, which is moved to the left to open position by springs (not shown), is latched in closed position by a latch lever 279 which is pivoted on a shaft 280 and engages an abutment 281 on the drawer to hold the drawer closed.

In Figure 22 is shown the mechanism which releases the drawer as the result of operation of the motor drive, or alternately by the use of the crank 63, both of which result in movement of the crank pin 142 through one revolution. In Figure 122 is shown the crank pin 142 and a dot-dash circle 143 showing the path of the axis of the crank pin during one revolution. Shown at 282 (see also Figure 2) is a shaft, mounted for rotation in the frame of the register, and having fixed to its inner end a drawer release lever arm 285. Fixed to the outer end of the shaft 282 is a manual drawer release lever arm 286 (see also Figure 2). Intermediate the lever arms 285 and 286, and in the same vertical plane as the connecting rod or link 145, is a motor driven drawer release and key resetting lever arm 287, also fixed to the shaft 282.

The lever arm 287 is somewhat hook-shaped in profile, as viewed in Figures 4 and 32, and has two cam follower surfaces 288 and 289, lying in the same plane as the connecting rod 145. In Figure 22, the crank pin 142 and rod 145 are shown in solid lines in their "home" position, and rotation of the crank pin is clockwise. During such rotation the rear curved edge 290 of the rod 145 serves as a cam. Shortly after the crank pin starts its cycle of rotation the edge 290 engages the follower surface 288 and rotates the lever 287 clockwise against the tension of a spring 291. This results in clockwise movement of the lever 287, shaft 282 and the drawer release lever arm 285, the lever 287 reaching the extreme clockwise position shown in dotted lines at 287a. A pin 292 on the drawer latch lever 279 lies in the path of the lever arm 285, so that rotation of lever 285 moves the pin up to the dotted line position 292a, lifting the latch lever 279 from engagement with the abutment 281 and releasing the cash drawer 35.

After the rear curved edge 290 release the lever 287 the latter returns to its normal position shown in full lines in Figure 22. As the crank pin 142 continues its rotation the control arm 82 (Figure 3) and other associated mechanism previously described, are driven through their normal cycle of operations until the crank pin 142 again reaches its "home" position.

An elongated yoke is formed to have spaced legs 296 and 297 (Figure 22) integrally connected by a transverse strap 298, the entire yoke being mounted for pivotal movement upon a shaft 299. The leg 296 carries a pin 300 that is engaged in a slot 301 at the bottom of the depending leg 278 of the release plate 98, so that when the release plate is rotated clockwise by depression of a key in the release key bank 39 the yoke with its legs 296 and 297 will rotate counterclockwise, the pin 300 moving to the position shown at 300a. The other leg 297 has a pin 302 by which a link 303 is pivotally connected to the leg 297, the other end of the pin having a pin or roller 304 that rides upon the top edge of the latch lever 279.

When the register is in the "home" position the pin 304 rests upon a rise 305 on the latch lever, but when pin 300 is moved counterclockwise to the position at 300a the pin 304 is pulled to the right by the link 303 and falls into a depression 306 adjacent the rise 305. The pin 304 supports an elongated key releasing the yoke 307 that extends transversely of the register and engages the bottoms of the legs 308 of the key locking or detent plates 309, which plates are pivotally mounted on the main shaft 68. The yoke 307 is pivotally supported upon the shaft 299 by a pair of upwardly extending integral ears 310, only one of which appears in dotted lines in Figure 22. Each of the vertical rows of keys shown in Figure 1 has a detent plate 309 and when a key in any of the rows is depressed, a pin 311 on the key moves the respective detent plate 309 clockwise until the pin clears an incline 312, after which the detent plate drops back to lock the key in depressed position. In every vertical bank except the release bank 39 a depressed key can be released by depressing another key in the bank, but once a key is depressed in the release bank 39 it cannot be raised again since its depression results in the rotation of the release plate 98 and operation of the register. Simultaneously with the rotation of the release plate and the consequent rotation of the yoke having the legs 296 and 297, a transversely extending strap member 313, integral with the said yoke, rotates to a position where it blocks the release of the keys in the clerks key bank 34 or the amount key banks 36 until the register has nearly completed a cycle of operation. The latch plates which are so actuated by the blocking strap member 313, and the rear legs on the latch plates 309 which are also blocked by it are not shown in the drawings, but may be seen in Figure 1 of the Paden Patent 1,708,189.

Referring again to Figure 22 where the latch lever 279 and the key releasing yoke 307 are shown in their "home" positions, it is seen that if the latch lever 279 is raised it will lift the yoke 307 and rotate the detent plates 309 to unlatch the keys. However, since the link 303 has moved the pin 304 into the depression 306 before the latch lever 279 is lifted by the drawer release lever arm 285 to open the drawer, the lifting of the latch lever 279 will not raise the yoke 307 sufficiently to release the keys.

However, as the crank pin 142 continues its rotation, the rear curved edge 290 of the rod 145 strikes the other cam follower surface 289 on the lever arm 287, again causing lever arm 285 to engage the pin 292 and raise the latch lever 279. Before this time however, the control arm 82, in returning to its home position, has returned the release plate 98 to the home position, resulting in the movement of pins 300 and 304 back to their home positions. Thus at the time that the latch lever 279 is raised the second time the pin 304 is again resting on the rise 305, and the strap member 313 has been removed from its blocking position with respect to the rear legs (not shown) of the detent plates 309. Therefore when the link 145 strikes the follower surface 289 to raise the latch lever 279 the pin 304 will turn the transverse key releasing yoke 307 clockwise, with the result that it pushes upwardly on the legs 308 of the detent plates 309 to rotate the detent plates clockwise and release all of the depressed keys.

As previously described, in connection with Figures 13 and 14, although return of the release plate 98 to home position results in the raising of the motor starting key 113, the main switch to the driving motor is still closed until the drive shaft has made almost two complete revolutions. Consequently, the drive motor is still operating at the time that the rod 145 engages the cam follower surface 289 in Figure 22, and for a time thereafter.

Still referring to Figure 22, it will be seen that if the control arm 270 is held depressed in its counterclockwise dot-dash line position the slot in its right end will not permit the pin 277 and consequently the release plate 98 to return to their home positions. This will lock the register in an uncompleted cycle position, because the overload clutch (Figure 17) will disengage and permit the motor and transmission to complete their cycle while the register remains locked. Such an occurrence may come about through either accidental or intended abuse of the handle 56, by pushing it up to the position shown at 56*a* and forcefully holding it there, either during a total reading operation or by pushing it up at the same time that a key is depressed in the release bank 39 during an ordinary registering operation. In order for the control arm to be returned to home position by the register, the pin 274 would have to cam the ear 272 downward against the combined forces of friction and the pressure exerted by the operator.

Figure 23:
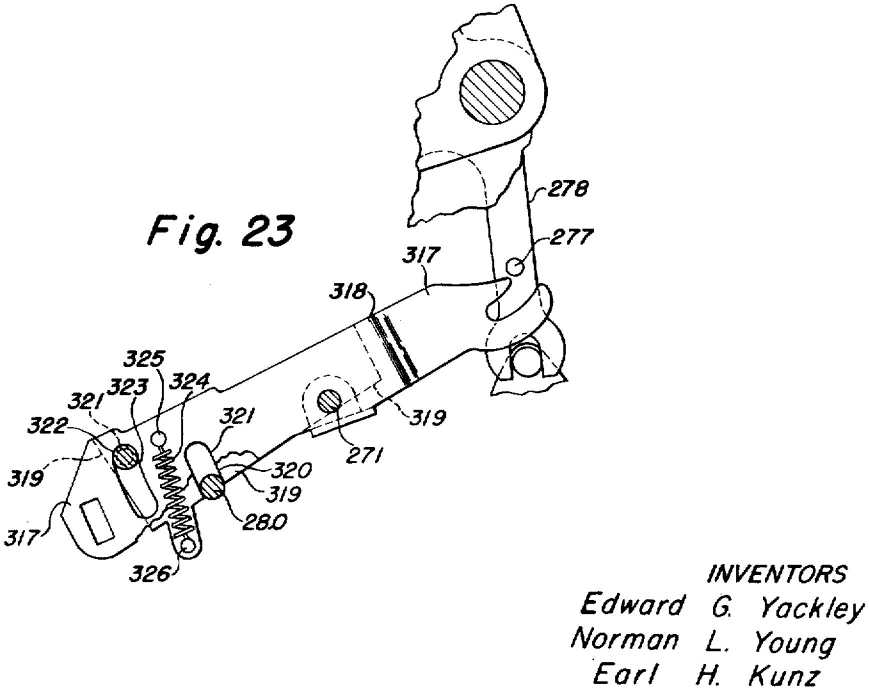
Figure 23 is a side view of a portion of Figure 22, but showing a modification.

In Figure 23 is shown one embodiment of safety means which will enable the register to complete its cycle even though the operator holds the handle 56 in the upper position 56*a*. Here the control arm 317 has the same outline in profile as has the control arm 270 of Figure 22. However it has a lateral offset formed by a bend in a vertical plane at 318, so that its portion to the right of the bend 318 lies in a vertical plane behind that of the portion to the left of the bend. Pivoted upon the same shaft 271 as the control arm 317, and lying in the same vertical plane as the right end portion of the control arm 317, is a shorter auxiliary arm 319, having a curved slot 320 in juxtaposition with a similar slot 321 in the arm 317 for the passage of the shaft 280. The pin 321 which corresponds to the pin 274 of Figure 22 is carried by the auxiliary arm 319, and is formed by a rearward extension on a screw member threaded into the auxiliary arm 319 and having a cylindrical head 322. The head 322 lies in the plane of the left hand portion of the control arm 317, which has an arcuate slot 323 therethrough to receive the head. The auxiliary arm 319 is movable about the shaft 271 relatively to the control arm 317, but its movement clockwise is limited by the upper limit of the slot 323, which forms a stop for the screw head 322. It is urged clockwise with respect to the control arm 317 by a tension spring 324 which is stretched between a pin 325 on the control arm 317 and another pin 326 on the auxiliary arm 319, the pin 326 extending underneath and past the control arm 317.

The embodiment shown in Figure 23 operates in the same manner as the one shown in Figure 22. However, when the control arm 317 is depressed by the handle 56 and engages the pin 277 in the manner shown in dot-dash lines in Figure 22, even though the pin 321 on the auxiliary arm 319 is held in depressed position by the handle 56, the control arm 317 can be rotated clockwise and back to its home position by the pin 277 because of the resilient connection formed by the spring 324 and the pins 325 and 326. The drive motor will therefore not clutch out, and the register can proceed through a complete operating cycle.

Referring again to Figure 22, the peripheral notches 102 on the release plate 98 form cam surfaces by which the release plate is turned clockwise to initiate an operating cycle when one of the keys in the release bank 98 is depressed, the corresponding pin 99 engaging in a notch as previously described. In the normal operation of the register the key is held depressed both by the notches 102 in the release plate 98 engaging the pin 99 and by the notches in the detent plate 309 engaging the pin 311. During the return stroke of the control arm 82 the release plate and the detent plate are actuated to release the depressed keys as previously described. It is always a key in the release bank 39 that is the last one to be depressed, since it actuates the register, and the operator normally releases his pressure upon the key as soon as he has depressed it. However, if the operator maintains his pressure upon the depressed key in the key bank 39 he can thus prevent the return of the release plate 98 to home position, and the registering mechanism will be locked in an incomplete cycle while the overload clutch (Figure 17) releases and allows the drive shaft 119 to complete its two revolutions.

Figure 24:
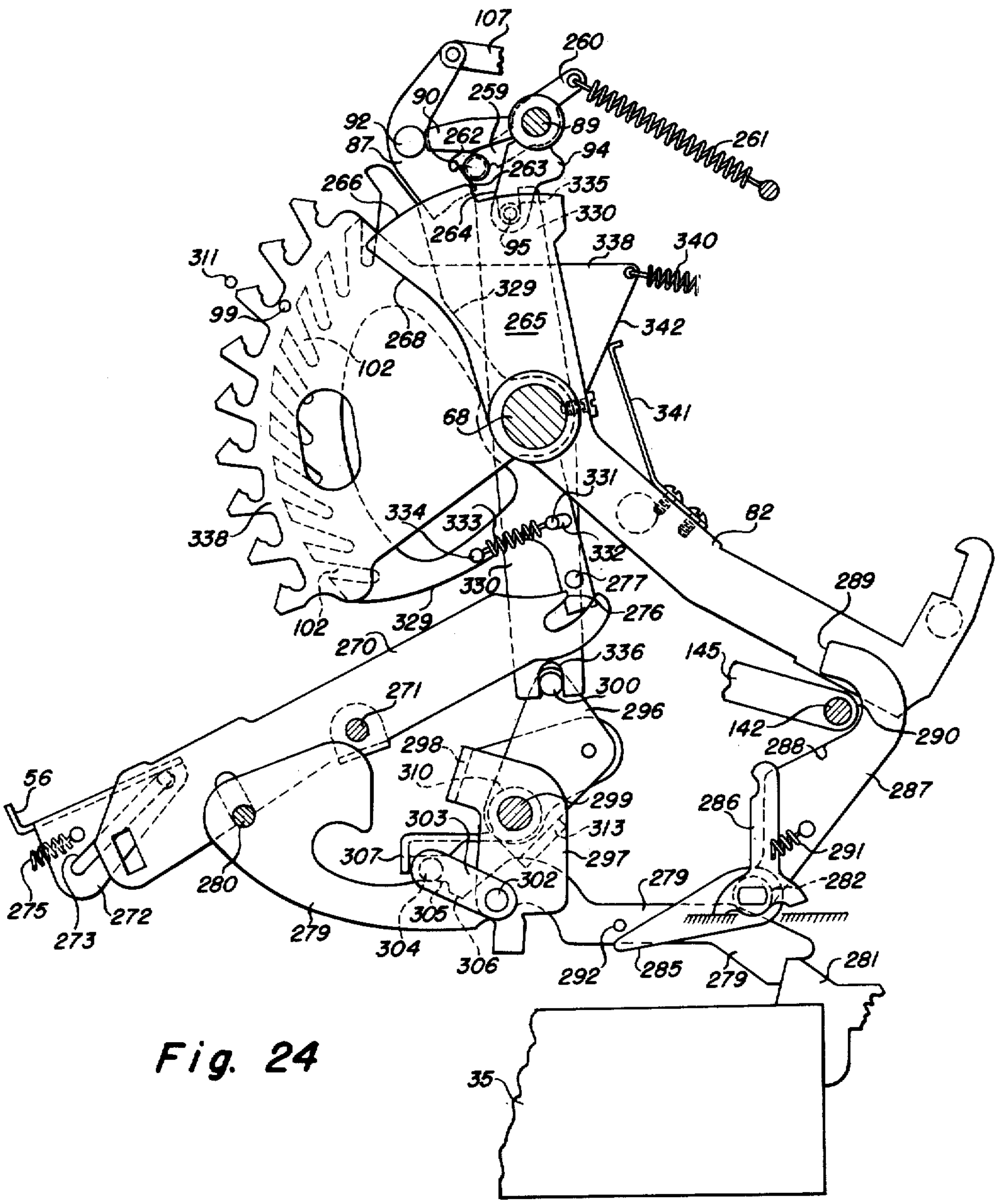
Figure 24 is a view similar to Figure 22 but showing a second modification.

One embodiment of mechanism which will prevent the jamming of the machine in the above manner is shown in Figure 24. In this embodiment the auxiliary control arm 319 of Figure 23 is not needed, and the control arm 270 of Figure 24 is the same as the one of Figure 22. In Figure 24 the release plate 329 is substituted for the previously described release plate 98, and it will be noted that the release plate 329 is not provided with slots for engagement with the pin 300 or the pin 95 on the leg 94 of the bell crank on the shaft 89. It does, however, retain the pin 277 for engagement with the control arm 270 for reading the totals as described in connection with Figure 22. An auxiliary release plate 330 is pivotally mounted upon the main shaft 68 right next to the release plate 329, and a pin 331 on the release plate protrudes through an arcuate slot 332, being resiliently urged against the left end of the slot by a tension spring 333, the other end of which is connected to release plate 329 by a pin 334. The spring 333 is strong enough to cause the release plate and auxiliary release plates to move together under normal operating conditions, but relative movement between the two plates is permitted, limited by the length of the slot 332.

At its upper end the auxiliary release plate 330 has a vertical slot 335 which receives the pin 95 on leg 94 of bell crank 90—94. On its lower end the auxiliary release plate has a vertical slot 336 which engages the pin 300 on the leg 296 of yoke 296—297. With this arrangement it will be apparent that the register cannot be jammed by holding a key down and preventing the release plate 329 from returning to home position. When the release plate is so held, the auxiliary release plate can still move counterclockwise against the tension of spring 333, and thus the register can complete its cycle. It will also be noted that holding the release plate 329 by means of the control arm 270 and the handle 56 similarly cannot lock the register in an incomplete cycle, so that the modified release plate structure of Figure 24 eliminates the need of the modified control arm and auxiliary control arm 319 of Figure 23.

Referring to Figure 22, it will be noted that the holding of a key depressed in the release bank 39 will also prevent clockwise rotation of the detent plate 309, with the consequence that its leg 308 will prevent lifting of the key releasing yoke 307 to release the depressed keys in the other banks. For this reason a modified detent plate 338 is used in the embodiment of Figure 24. The peripheral detent teeth 339 are reversed so that depression of a key results in counterclockwise rotation of the detent plate instead of a clockwise rotation as in Figure 22. The release plate 338 is resiliently urged clockwise by a tension spring 340 so as to latch the pin 311 under a detent tooth when a key in the release bank 39 has been depressed. The modified detent plate is used only for the keys in the release bank 39, and it does not have a depending leg engageable by the key releasing yoke 307 as do the detent plates for the other banks of keys. Instead of being released by the yoke 307, the modified detent plate is turned counterclockwise to release its depressed key by means of a resilient arm 341 adjustably secured to the main control arm 82 so that during the return movement of the control arm to home position it will engage a rear edge 342 of the detent plate 338 and rotate the detent plate against the tension of spring 340 to release the pin 311 of the depressed key. With this embodiment, the detent plate 329 is not effective to hold the pin 311 on the depressed key until the main control arm 82 has moved sufficiently to disengage arm 341 from edge 342 at the beginning of a cycle. However, this movement takes place before the operator can release the key, and the key will also be maintained in depressed condition by the engagement of a pin 99 in its notch 102 in the release plate 329.

We have thereby provided a novel cash register having a selective motor or hand driven mechanism, and the controls of the machine are so constructed and arranged that operation of the machine results only from the depression of any key in a register control or release bank.

No extra motor control bar or the like is required. Means are incorporated into the mechanism to prevent the jamming of the register by incorrect operation of the controls, either intentional or accidental. Speed of the operating cycle of the register is adjustable by a motor speed control that is independent of variations in the supply voltage, so that such variations cannot cause operation of the register at speeds higher than designed for normal and accurate registrations. Whether motor or hand operated the register will always operate through a complete cycle independently of the closing of the cash drawer, which closing was formerly required in registers of this type to complete a registering cycle.

What is claimed and desired to be secured by United States Letters Patent is:

1. In a register, a reciprocable control element, a reciprocable bar operable to follow the movement of said control element; selectable means for stopping said bar in any one of several selectable positions; means for indicating the position of said bar when stopped by said selectable means; an electric motor drive, said drive including a crank pin and a rod connecting said crank pin to said control element, whereby said drive is operable to move said control element in a fixed cycle first in one direction and then back to its home position; a release plate mounted for reciprocating movement away from and toward its home position, said release plate being shiftable away from its home position by said selectable means; said plate being effective to energize said motor drive when shifted from its home position; and means operative to connect said control element and said release plate during the return stroke of said control element, to move said release plate back to home position, whereby said motor drive is de-energized.

2. In a register, a reciprocable control element, a reciprocable bar operable to follow the movement of said control; selectable means for stopping said bar in any one of several selectable positions; an electric motor drive, said drive including a crank pin and a rod connecting said crank pin to said control element, whereby said drive is operable to move said control element in a fixed cycle first in one direction and then back to its home position; a cash drawer; a latch for releasably holding said drawer closed, said motor drive in its movement being operative to release said latch; a release plate mounted for reciprocating movement away from and toward its home position, said release plate being shiftable away from its home position by said selectable means; said plate being effective to energize said motor drive when shifted from its home position; and means operative to connect said control element and said release plate during the return stroke of said control element, to move said release plate back to home position, whereby said motor drive is de-energized.

3. In a register, a reciprocable control element, a reciprocable bar operable to follow the movement of said control element; depressable keys for stopping said bar in any one of several selectable positions; a reciprocable detent plate operable to lock the selected key in depressed position; an electric motor drive, said drive including a crank pin and a rod connecting said crank pin to said control element, whereby said drive is operable to move said control element in a fixed cycle first in one direction and then back to its home position; a cash drawer; a latch for releasably holding said drawer closed, said motor drive in its movement being operative to release said latch and in a subsequent part of its movement to release said detent plate and the key held thereby; a release plate mounted for reciprocating movement away from and toward its home position, said release plate being shiftable away from its home position by any of said keys when depressed; said release plate being effective to energize said motor drive when shifted from its home position; and means operative to connect said control element and said release plate during the return stroke of said control element, to move said release plate back to home position.

4. In a register, a reciprocable control element, a reciprocable bar operable to follow the movement of said control element; depressable keys for stopping said bar in any one of several selectable positions; a reciprocable detent plate operable to lock the selected key in depressed position; an electric motor drive, said drive including a crank pin operable through a single revolution and a rod connecting said crank pin to said control element, whereby said crank pin is operable to move said control element in a fixed cycle first in one direction and then back to its home position; a cash drawer; a latch for releasably holding said drawer closed, said crank pin in a first part of its revolution being operable to momentarily lift said latch to release said drawer and in a second part of its revolution to lift said latch and release said detent plate and the key held thereby; a release plate mounted for reciprocating movement away from and towards its home position, said release plate being shiftable away from its home position by any of said keys when depressed, and when shifted from its home position, to prevent the release of said detent plate by said latch when the latch is lifted to release said drawer; said release plate being effective to energize said motor drive when shifted from its home position; and means operative to connect said control element and said release plate during the return stroke of said control element, to move said release plate back to home position.

5. In a register, a release plate reciprocable from a home to a second position; manual means operable to shift said plate to said second position; an electric motor drive having means controlled by said release plate in its movement to operate said drive through one cycle, said drive including an overload clutch, said drive being operative to return said release plate to home position; and resilient means between said manual means and said overload clutch, said resilient means being constructed and arranged to enable said drive to complete a cycle of operation if said manual means is maintained in a position to hold said plate in said second position.

6. In a register, a plate reciprocable from a home to a second position; an electric motor drive having means controlled by said plate in its movement to operate said drive through one cycle, said drive including an overload clutch; manually movable means operable to shift said plate to said second position; and means forming a resilient connection between said manual means and said plate, said resilient connection enabling the return of said plate to home position while said manually movable means is maintained in position to hold said plate in said second position; said motor drive being operative to return said release plate to home position, and said overload clutch having sufficient capacity to return said plate to home position against the force exerted by said resilient connection.

7. In the apparatus described in claim 6; a first shaft, said plate being mounted for rotation upon said first shaft; a second shaft laterally spaced from said first shaft; said means forming a resilient connection including a control arm pivoted upon said second shaft, means for connecting said control arm and said plate; and a resilient connection between said manually movable means and said control arm.

8. In the apparatus described in claim 6, a shaft, said plate being mounted for rotation upon said shaft; said means forming a resilient connection including a second plate mounted for rotation upon said shaft, means connecting said manually movable means and said second plate, and a spring connecting said first mentioned plate and said second plate.

9. In a register, a shaft; a release plate mounted upon said shaft for reciprocable movement between a home and a second position; an auxiliary release plate mounted upon said shaft; a lost motion connection between said release plate and said auxiliary plate; a spring connecting said plates to enable said auxiliary plate to return to its home position independently of said release plate; an electric motor drive having means controlled by said auxiliary release plate in its movement to operate said drive through one cycle, said drive including an overload clutch; manually movable means operable to shift said release plate to said second position; said motor drive being operative to return said auxiliary release plate to home position, and said overload clutch being operative to overcome said spring if said manually movable means is maintained so as to hold said release plate in said second position.

10. In the apparatus described in claim 9, a second manually movable means; a control arm connected to said second manually movable means for operative thereby to be connected to and to rotate said release plate from said home to said second position.

EDWARD G. YACKLEY.
NORMAN L. YOUNG.
EARL H. KUNZ.

REFERENCES CITED

The following references are of record in the file of this patent:

UNITED STATES PATENTS

| Number | Name | Date |
|---|---|---|
| 1,144,418 | Kettering | June 29, 1915 |
| 1,317,965 | Dennis | Oct. 7, 1919 |
| 1,394,256 | Fuller | Oct. 18, 1921 |
| 1,466,832 | Hren | Sept. 4, 1923 |
| 1,619,796 | Shipley | Mar. 1, 1927 |
| 1,708,189 | Paden | Apr. 9, 1929 |
| 1,770,708 | Paden | July 15, 1930 |
| 1,851,267 | Wheelbarger | Mar. 29, 1932 |
| 1,917,356 | Brand | July 11, 1933 |
| 1,993,452 | Paden | Mar. 5, 1933 |
| 2,004,282 | Horton | June 11, 1935 |
| 2,017,641 | Uhlig | Oct. 15, 1935 |
| 2,099,560 | Fried | Nov. 16, 1937 |
| 2,116,779 | Breitling | May 10, 1938 |
| 2,201,319 | Paden | May 21, 1940 |
| 2,357,571 | Anderson | Sept. 5, 1944 |

Certificate of Correction

Patent No. 2,581,463

January 8, 1952

EDWARD G. YACKLEY ET AL.

It is hereby certified that error appears in the printed specification of the above numbered patent requiring correction as follows:

Column 14, line 38, for "turned" read *returned*; line 60, for "1,700,708" read *1,770,708*; column 15, line 61, for "32" read *22*; column 16, line 36, strike out "the" before "yoke";

and that the said Letters Patent should be read as corrected above, so that the same may conform to the record of the case in the Patent Office.

Signed and sealed this 22nd day of April, A. D. 1952.

[SEAL]

THOMAS F. MURPHY,
*Assistant Commissioner of Patents.*